A. L. SNOW.
SPRING.
APPLICATION FILED MAR. 15, 1909.
997,424.
Patented July 11, 1911.
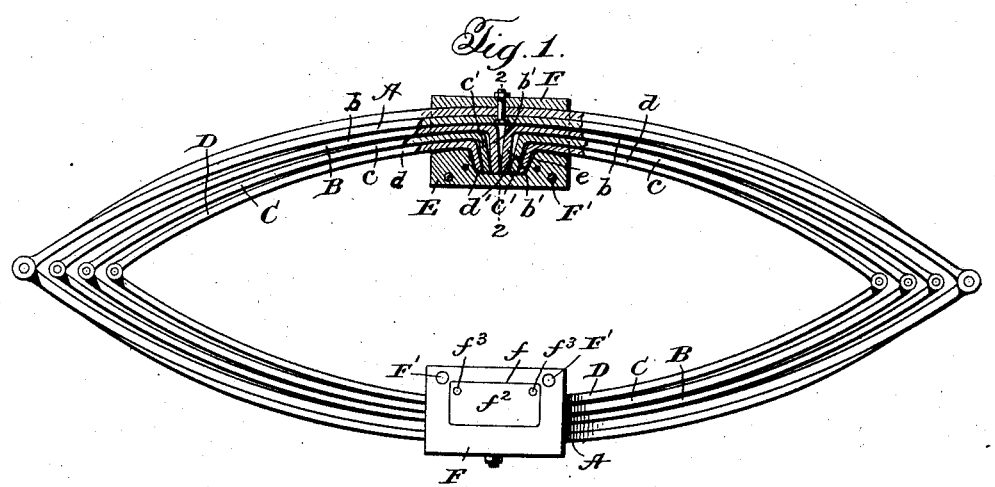
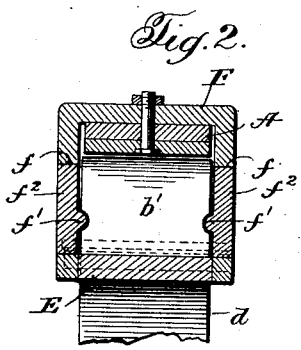
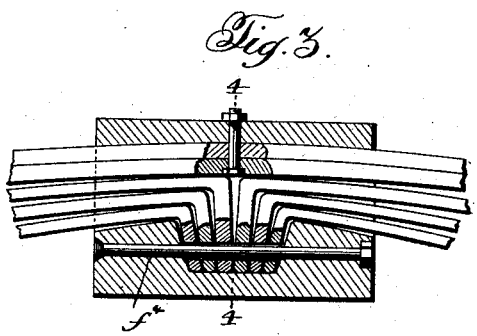
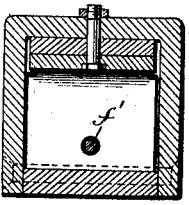
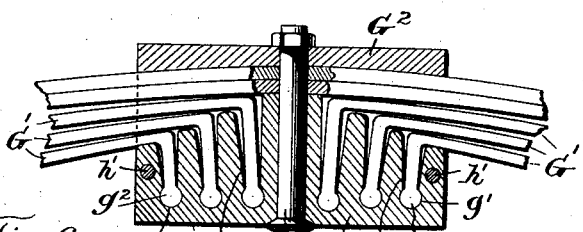
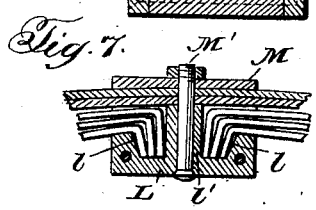
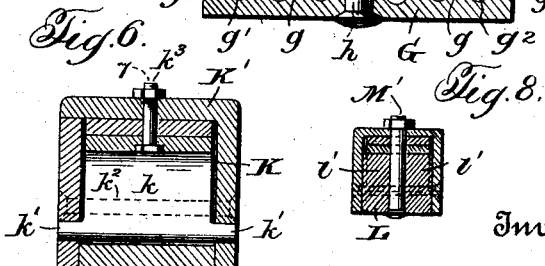
Witnesses:
Jas E. Hutchinson
Thos. R. Heath
Inventor:
Arthur L. Snow,
By his Attorneys

UNITED STATES PATENT OFFICE.

ARTHUR L. SNOW, OF KINGFISHER, OKLAHOMA, ASSIGNOR TO GRACE C. SNOW, OF COMFORT, TEXAS.

SPRING.

997,424.  Specification of Letters Patent.  Patented July 11, 1911.

Application filed March 15, 1909. Serial No. 483,547.

*To all whom it may concern:*

Be it known that I, ARTHUR L. SNOW, a citizen of the United States, residing at Kingfisher, in the county of Kingfisher and State of Oklahoma, have invented certain new and useful Improvements in Springs, of which the following is a specification, reference being had therein to the accompanying drawing.

This invention relates to an improvement in springs designed principally for use on vehicles and more particularly to the type of vehicle springs in which a primary spring is utilized in connection with one or more supplemental springs, which supplemental springs are adapted to be successively brought into action to assist the primary spring in sustaining the load and taking up sudden shocks.

The primary object of the present invention is the provision of a spring of this character which is of such a construction that it will efficiently perform the functions for which it is designed and the various parts of which can be economically manufactured and assembled.

A further object of the invention is the provision of a spring of this character, the supplemental springs of which will act with the least amount of friction and which will be so assembled that they cannot work loose or rattle regardless of the vibration to which the vehicle is subjected.

A number of embodiments of the invention are illustrated in the accompanying drawings, but it will be understood that many changes may be made in the forms therein shown without departing from the spirit and scope of the invention as defined in the appended claims.

In the drawings, wherein like numerals of reference refer to similar parts in the several views, Figure 1 is a longitudinal section showing the invention as applied to an elliptic spring, Fig. 2 is a cross section on lines 2—2 of Fig. 1, Fig. 3 is a longitudinal section of a modified form of supporting block and saddle which may be used in lieu of that shown in Fig. 1, Fig. 4 is a cross section on line 4—4 of Fig. 3, Fig. 5 is a longitudinal section of another modified form of supporting block and saddle, Fig. 6 is a cross section of a modified form of the invention, Fig. 7 is a longitudinal section of a modified form of the invention, Fig. 8 is a cross section of the form shown in Fig. 7.

Referring now more particularly to the drawings, in Fig. 1 an elliptic spring is shown embodying the invention, which spring comprises an outer elliptic spring A, which is adapted to support the load at all times and is formed of two semi-elliptic members having their ends pivotally connected together, and a plurality of secondary elliptic springs which are positioned within the primary spring A and are adapted to be brought into action to assist the spring A after the same has been moved to a predetermined extent in either direction, in a manner to be hereinafter more particularly set forth. The secondary springs B, C and D comprise upper and lower sections, the outer ends of which are pivotally connected to each other. The upper and lower sections of the spring are identical in construction and the detail construction of the upper section only will for that reason be herein set forth.

The upper sections of the supplemental springs B, C and D are each formed of two spring members $b$, $b$, $c$, $c$, and $d$, $d$, the inner ends of which terminate in inwardly bent portions $b'$, $c'$, and $d'$, the outer faces of which are slightly inclined. The inwardly bent portions $b'$ of the spring member $b$, $b$ are positioned with their lower edges in contact and with their upper edges slightly out of contact, while the inwardly bent portions $c'$ of the spring members $c$, $c$ lie directly outside of the inwardly bent portions $b'$, and the inwardly bent portions $d'$ of the spring members $d$, $d$ in turn lie directly outside of the inwardly bent portions $c'$, so that the inner ends of the several spring members are nested, which enables the same to be compactly assembled. The inwardly bent portions $b'$, $c'$ and $d'$ of the spring members rest in a recess $e$ formed in the outer face of a supporting block E, the outer walls of said recess being slightly flared. The inwardly bent portions $b'$, $c'$ and $d'$, are of such a size that when they are positioned in the supporting block, the lower ends thereof will completely fill the base of the recess in the supporting block and will lie in contact with each other, so that all of the spring members are capable of a pivotal movement in said supporting block. While the lower ends of the inwardly bent portions $b'$, $c'$ and $d'$ of the spring members lie in contact with each other, the upper ends thereof are slightly spaced from each other and from the end walls of the recess $e$ in the supporting block, which is due to the inclination of the faces of the inwardly bent ends of the spring members and of the end walls of the recess in the supporting block.

F designates an inverted U-shaped saddle, which is bolted or otherwise rigidly secured to the upper section of the primary spring A, the sides of said saddle extending down alongside of the sides of the supporting block E and being provided with openings $f$ therein which overlie the open sides of the recess $e$ in the supporting block E. The saddle is rigidly secured to the supporting block by means of bolts $F'$, which pass through the side walls thereof and through the body of the supporting block. To prevent rattling of the parts due to vertical movement of the inwardly bent ends $b'$, $c'$ and $d'$ of the spring members in the recess $e$ in the supporting block, said inwardly bent ends are provided on their edges with inwardly extending notches into which project ribs $f'$ which are formed on the inner surfaces of plates $f^2$ which fit within the openings $f$ formed in the side walls of the saddle F, the inner faces of said plates lying against the sides of the supporting block E and the outer faces of the plate lying flush with the outer surfaces of the sides of the saddle F, the plates $f^2$ are rigidly secured to the supporting block E by means of bolts $f^3$ which pass through the plates and the interposed supporting block. Enough play is allowed between the ribs $f'$ and the notches in the sides of the inwardly bent ends of the spring members to allow for the pivotal movement of said spring members.

In the use of the spring as thus described, the primary spring A serves to support the load under ordinary conditions, the supplemental springs being idle, but if the primary spring is compressed beyond a predetermined extent, the adjacent downwardly extending end portions $b'$ of the spring members $b$, $b$ are caused to abut and the supplemental spring B is thus brought into action to assist the spring A in supporting the load. Should the primary spring be subjected to greater compression the supplemental springs C and D will be brought into action successively. If the primary spring A is subjected to expansion beyond a predetermined extent, the outer faces of the downwardly turned portions $d'$ of the spring members, $d$, $d$ will abut the end walls of the recess $e$ in the suporting block E and thereby bring the supplemental spring D into action to assist the main spring, and should the movement of the spring A in this direction be continued, the supplemental springs C and B will be brought into action successively.

In Figs. 3 and 4 of the drawings, a modified form of the invention is illustrated. The construction illustrated in these figures is identical with that shown in Figs. 1 and 2 except that vertical movement of the inwardly turned ends of the spring members is prevented by means of a pin $f^4$ which passes through the supporting block and through apertures in the inwardly turned ends of the spring members, there being sufficient play permitted between the pin and apertures to permit of the pivotal movement of the spring members. In this form of the invention, the plates $f^2$ described in connection with Fig. 1 are dispensed with, the sides of the saddle itself being utilized to cover the open sides of the recess in the supporting block.

In Fig. 5 is shown a modified form of the invention in which a supporting block G is employed which is provided on opposite sides of the center thereof with a plurality of downwardly extending pockets $g$ therein which extend completely across the supporting block, each of said pockets being adapted to support the inwardly turned end of a supplemental spring member. The lower ends of the pockets $g$ are provided with enlarged portions $g'$ which are substantially cylindrical in form. The supplemental springs $G'$ employed in this instance are substantially the same as the spring members heretofore described in connection with Fig. 1 except that the inwardly turned ends thereof are provided with enlarged ribs $g^2$ which are substantially cylindrical in form and are adapted to be fitted into the cylindrical portions $g'$ of the pockets $g$ of the supporting block G, said spring members being slipped into the pockets from the open ends thereof. The spring members are held in position in their respective pockets by means of an inverted U-shaped saddle plate $G^2$ which fits over the supporting block G, the top of said saddle plate resting in the top of the supporting block G and the sides of the saddle plate lying flat against the sides of the supporting block G and closing the ends of the pockets $g$ therein. The pockets $g$ are so formed that upon excessive movement of the primary spring in either direction, the inwardly turned ends of the supplemental spring members will abut the walls thereof and be brought into action, the pockets being of such a size that the springs will be successively brought into action. The primary spring employed with this form of the invention is of the usual type and rests upon the upper surface of the supporting block G and is rigidly secured thereto by means of a bolt $h$ which passes through the primary spring and the central portion of the supporting block. The bolt $h$ also passes through the top of the saddle plate $G^2$ and serves to rigidly connect the same to the supporting block. The saddle plate $G^2$ is also connected to the supporting block by means of bolts $h'$ which pass through the sides thereof and the interposed supporting block.

In Fig. 6 is illustrated a cross section illustrating a different manner of holding the spring members in position in their pockets in the supporting block. In this form of the invention I designates a supporting block and $k$ the inwardly turned end of a spring member K which fits in a pocket formed therein. The lower end of the inwardly turned end $k$ of the spring member K is provided with laterally projecting pintles $k'$ which are adapted to project through apertures in the side walls of a saddle K' which fits around the top and sides of the supporting block, one of the sides of said saddle being formed integral with the top thereof and the other side separate from the top so as to permit the parts to be assembled. The sides of the saddle are secured to the supporting block by suitable bolts $k^2$ and the top of the saddle and the primary spring which is positioned directly therebeneath are also rigidly secured to the supporting block by a bolt $k^3$ which passes through the central portion thereof. It is obvious that the same result may be obtained by providing the inner surfaces of the sides of the saddle K' with grooves into which the pintles $k'$ of the spring members project, instead of with apertures which extend entirely therethrough.

In Figs. 7 and 8 of the drawings, another modified form of supporting block and saddle plate is illustrated. In this form of the invention, a supporting block L is provided which has two recesses or pockets $l$ in the outer surface thereof, which are separated by a solid wall $l'$, the inwardly extending end portions of the spring members on one side of the spring are pivotally supported in one of the pockets $l$, while the inwardly extending end portions of the spring members of the supplementary springs on the other side of the spring are pivotally supported in the other pocket $l$. The primary spring in this form rests upon the top of the solid wall $l'$ of the supporting block and the supporting block and primary spring are both inclosed by an inverted U-shaped saddle M, said saddle and primary spring, and supporting block all being clamped together by a bolt M', which passes through the wall $l'$ of the supporting block, the primary spring, and the top of the saddle M and has threaded thereon a securing nut, the saddle being also rigidly secured to the supporting plate by means of bolts which pass through the side walls thereof and the interposed supporting block. The manner of securing the spring member in the pockets $l'$ is similar to that heretofore described with reference to Fig. 1 and need not therefore be again described in detail.

I claim:

1. In a device of the character described, a primary spring, a supporting member carried thereby having a pocket therein, and supplemental spring members provided with inwardly turned portions pivotally supported in said pocket, said supplemental spring members being adapted to be brought into action after a predetermined amount of compression of the primary spring.

2. In a device of the character described, a primary spring, a supporting member carried thereby having a pocket therein, supplemental spring members provided with inwardly extending portions pivotally supported in said pocket, and means for holding said supplemental spring members against movement in the pocket.

3. In a device of the character described, a primary spring, a supporting block provided with a pocket in the upper surface thereof, a plurality of supplemental spring members provided with inwardly extending end portions pivotally supported in said pocket, a saddle secured to the primary spring and embracing the supporting block, and means for securing the saddle and supporting block together.

4. In a device of the character described, a supporting block provided with a pocket extending across the outer face thereof, a primary spring, a plurality of secondary spring members provided with inwardly extending end portions pivotally supported in said pocket, an inverted U-shaped saddle inclosing the primary spring and supporting block, and means for clamping said saddle to the supporting block.

5. In a device of the character described, a primary spring, a supporting block having a pocket extending across the outer surface thereof, a plurality of supplemental spring members provided with inwardly extending end portions pivotally supported in said pocket, and means for closing the ends of the pocket in the supporting block and preventing vertical movement of the ends of the supplemental spring members therein.

6. In a device of the character described, a primary spring, a supporting block provided with a recess across the outer face thereof, a plurality of supplemental spring members provided with inwardly extending end portions pivotally supported in said recess, said end portions being provided with notches in the sides thereof, and members extending across the ends of the recess in the supporting block, and provided with ribs projecting into the notches in the inwardly extending ends of the supplemental spring members.

7. In a device of the character described a primary spring, a supporting block, a plurality of supplemental spring members pivotally connected to said block, and a saddle plate inclosing the supporting block and supplemental spring members.

8. In a device of the character described, a primary spring, a supporting block having a recess extending across the upper surface thereof, a plurality of spring members provided with inwardly extending end portions pivotally supported in said recess, said end portions having notches in the edges thereof, and an inverted U-shaped saddle fitted over the supporting block, the sides of said saddle carrying ribs engaging the notches in the edges of the ends of the spring members.

9. In a device of the character described, a primary spring, a U-shaped saddle secured thereto, a supporting block secured between the walls of said U-shaped saddle, and a plurality of supplemental spring members pivoted to said supporting block, said spring members being adapted to be brought into action only after a predetermined amount of compression of the primary spring.

10. In a device of the character described, a primary spring, a supporting block carried thereby having a recess in the outer surface thereof, the end walls of which are flared, and a plurality of supplemental spring members provided with inwardly extending end portions seated in and completely filling the bottom of the recess in said supporting plate.

11. In a device of the character described, a primary spring, a supporting member carried thereby and having a pocket therein, and a supplementary spring member provided with a laterally projecting portion fitting in said pocket said laterally projecting portion and pocket being provided with coöperating portions adapted to abut after a predetermined extent of movement of the primary spring.

In testimony whereof I affix my signature in presence of two witnesses.

ARTHUR L. SNOW.

Witnesses:
ALBERT FALLIN,
WM. FELLBAUM.